March 19, 1935.    H. W. ALDEN ET AL    1,994,935
BRAKE
Filed March 16, 1929    3 Sheets-Sheet 3

INVENTORS
Herbert W. Alden
and Nelson R. Brownyer
HIS ATTORNEYS.

Patented Mar. 19, 1935

1,994,935

UNITED STATES PATENT OFFICE 1,994,935

BRAKE

Herbert W. Alden and Nelson R. Brownyer, Detroit, Mich., assignors to The Timken-Detroit Axle Company, Detroit, Mich., a corporation of Ohio Application March 16, 1929, Serial No. 347,481

18 Claims. (Cl. 188—73)

This invention relates to brakes, particularly to disk brakes intended for use on the armature shafts of the driving motors of car trucks. Its principal objects are to provide for the use of a disk brake on the armature shaft of the driving motor, to provide for adjusting the brake shoes to take up wear and to correctly position the shoes with relation to the brake disk, to provide for supporting the outer end of the armature shaft, to make the parts easily accessible and to provide for simplicity of construction, compactness of design and easy operation of the brake. The invention consists in the brake and in the parts and arrangement of parts hereinafter described and claimed.

In the accompanying drawings, which form part of this specification and wherein like symbols refer to like parts wherever they occur, Fig. 1 is a plan view showing the commutator end of an electric motor supported on the end cross-member of a car truck and provided with a brake mechanism embodying our invention;

Figure 1:
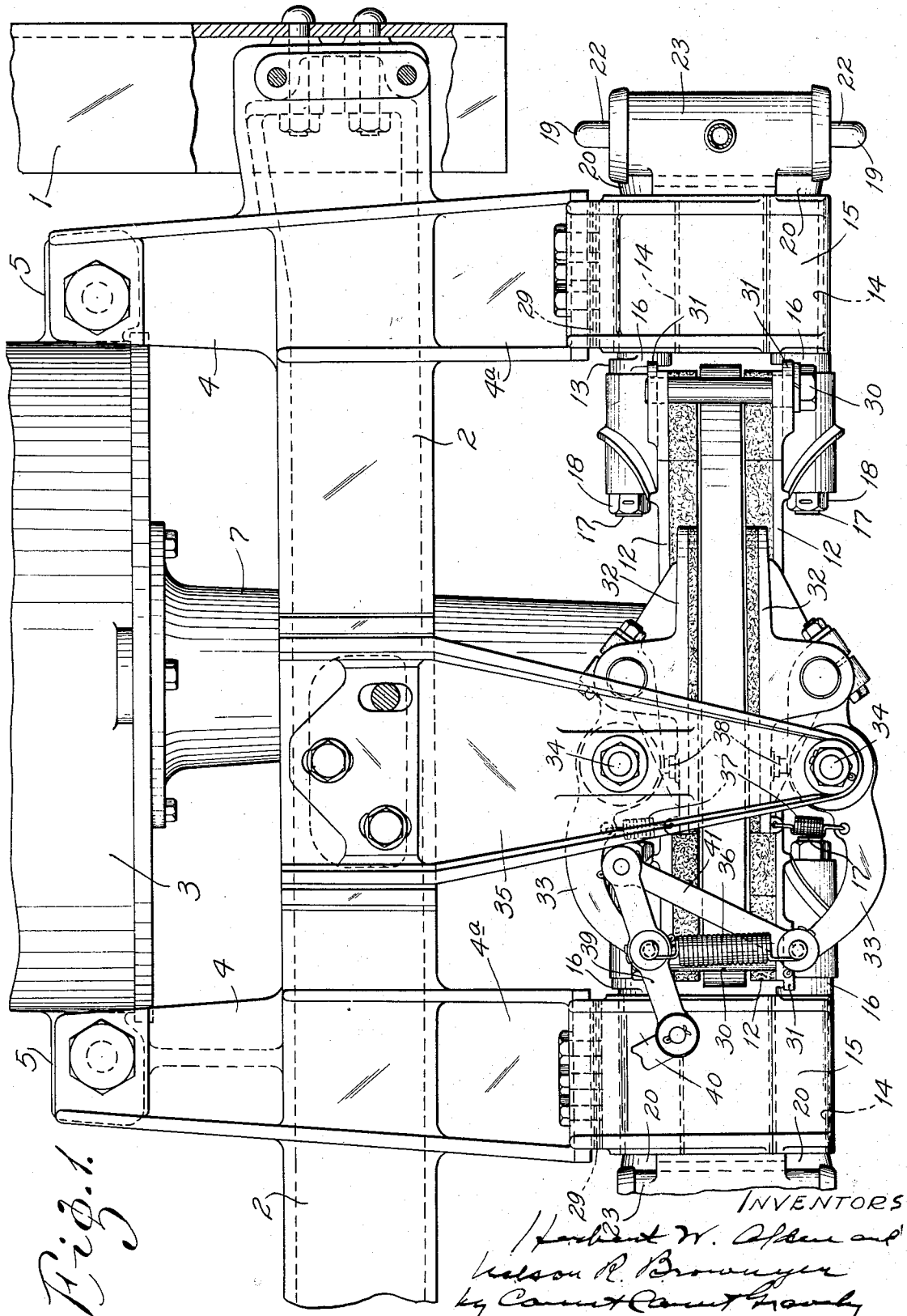
Figure 2:
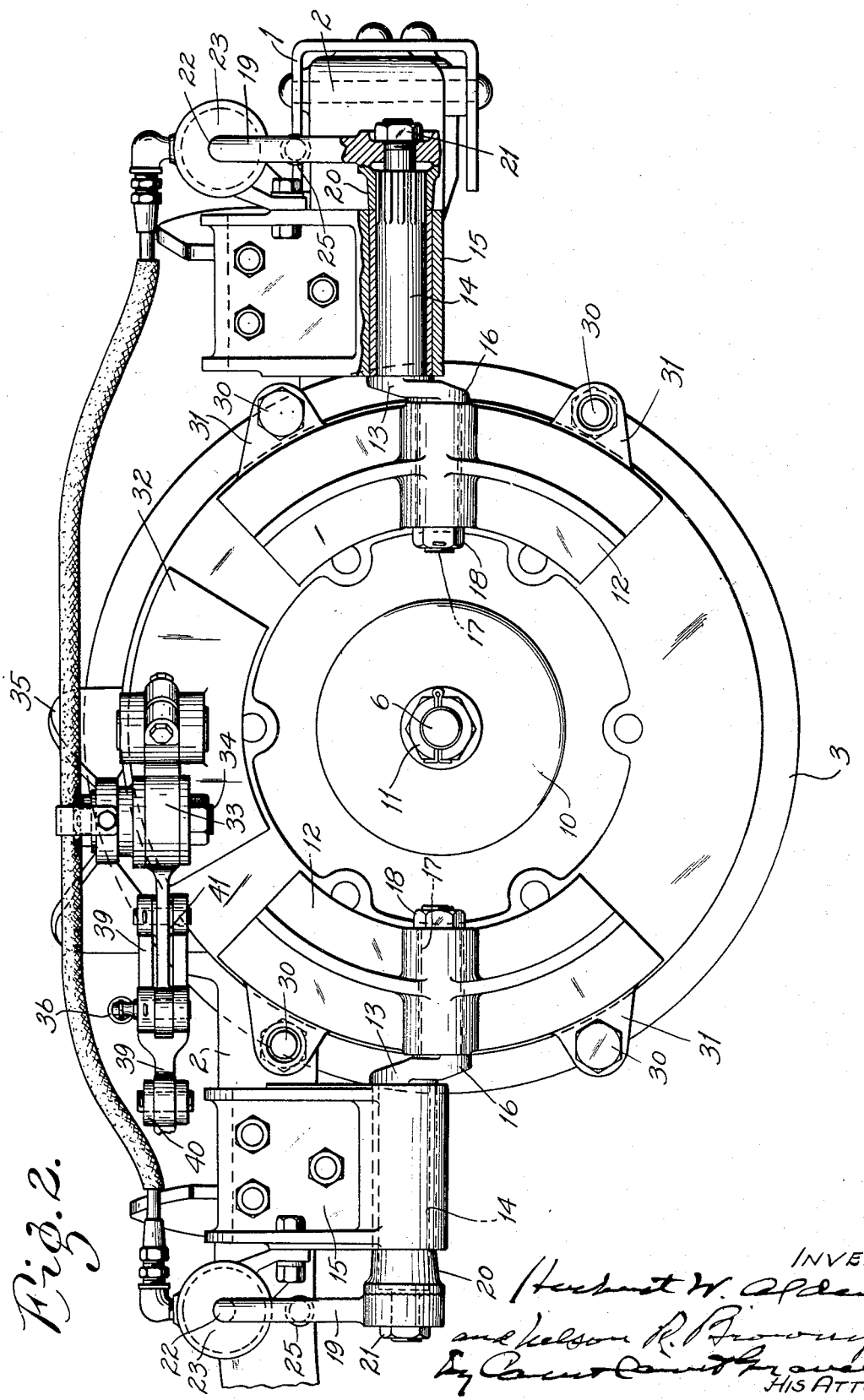
Fig. 2 is an end view of the parts shown in Fig. 1.
Figure 3:
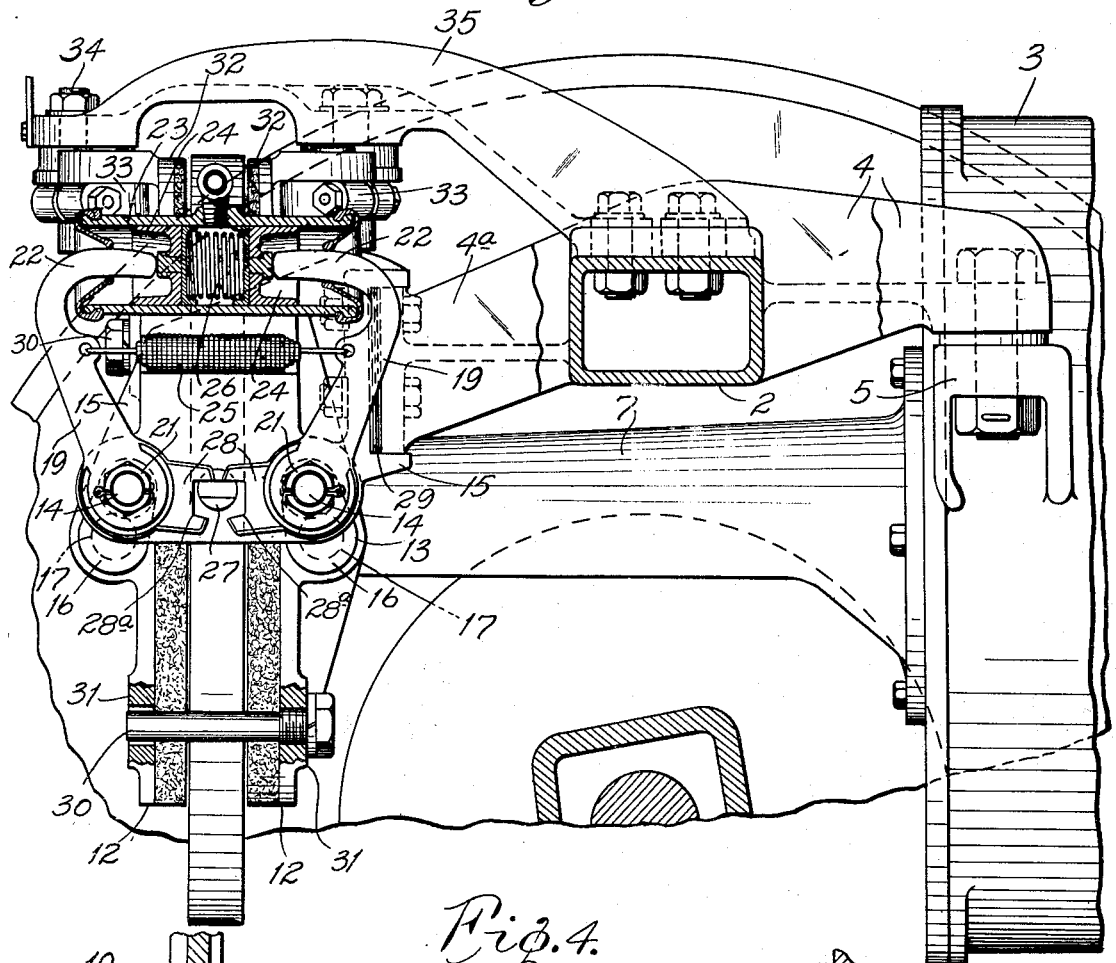
Fig. 3 is a side elevation of the commutator or braking end of the motor and the brake therefor, the end cross-member of the street car truck being shown in vertical cross-section.
Figure 4:
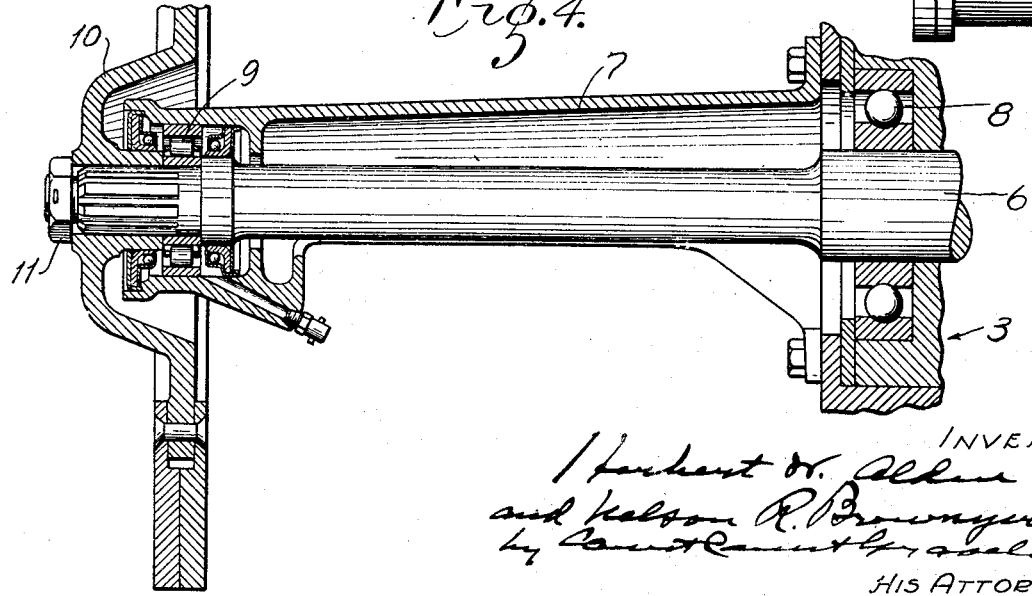
Fig. 4 is a vertical longitudinal section through the housing for the armature shaft extension and the brake disk at the outer end thereof.

Referring to the accompanying drawings, our invention is shown in connection with a street car truck comprising side frames 1 connected at each end by an end cross-member 2 adapted to support the commutator end of one of the electric driving motors 3 for said truck. Preferably the end cross-member comprises a hollow casting secured at its ends to the respective side frames 1 of the truck and provided intermediate its ends with two longitudinally spaced laterally extending brackets 4 that are bolted or otherwise rigidly secured to outstanding lugs 5 on the sides of the motor 3 adjacent to the outer or commutator end thereof.

The armature shaft 6 of the motor 3 extends beyond the commutator end of said motor and is housed within a tubular housing or extension 7 that is bolted or otherwise rigidly secured to said end of said motor. The armature shaft 6 is rotatably supported in a suitable antifriction bearing 8 provided therefor in the commutator end of the motor; and said shaft is also supported at its outer end in a roller bearing 9 located in the outer end of the housing 7 therefor. The armature shaft 6 extends beyond the outer end of the housing 7 therefor and has the hub portion of a suitable brake disk 10 mounted thereon. The hub portion of the brake disk 10 has longitudinal grooves or keyways formed therein adapted to cooperate with corresponding portions of the armature shaft 6, whereby said disk is adapted to rotate with said shaft and is removable axially therefrom. The inner end of the hub of the brake disk bears against a shoulder on the armature shaft; and a nut 11 is threaded on the end of said shaft for retaining said disk thereon.

Diametrically opposed pairs of brake shoes 12 bear flatwise against the opposite side faces of the brake disk 10, the shoes of each pair being moved towards and away from each other into and out of engagement with the braking surface of said disk by means of a pair of cranks 13. The two cranks 13 for each pair of brake shoes 12 have their shaft portions 14 journaled in horizontally disposed parallel bearings provided therefor in a block 15, which is bolted or otherwise rigidly secured to the outer end of an outstanding bracket 4a formed integral with the end cross-member 2 of the truck.

As shown in the drawings, the two cranks 13 for each pair of brake shoes are disposed with their shafts 14 transverse to the axis of the brake disk and are provided at their shoe engaging ends with depending arms 16 that terminate at their lower ends in cylindrical pins 17 that are located one on each side of said brake disk and extend through horizontal bores provided therefor in brake shoes and thus constitutes supports therefor. The ends of the crank pins 17 extend beyond the inner edges of the brake shoes and are threaded to receive nuts 18 which serve to hold said shoes on said pins. The shafts 14 of the cranks 13 extend beyond the outer side face of the supporting block 15 therefor and have operating arms 19 sleeved thereon. Mounted on the shafts 14, between the blocks 15 and the operating arms 19, are sleeves 20 that are rigidly secured to the respective crank shafts by cooperating longitudinal grooves and ribs in the hubs of said arms and on said shafts. The opposing end faces of the sleeves 20 and the hubs of the arms 19 are provided with radially extending teeth that are held in engagement with each other by nuts 21 threaded on the outer ends of the crank shafts 14, whereby the crank shafts 14 and the sleeves 20 fixed thereon are forced to rotate with said arms. The two operating arms 19 for each pair of cranks 13 extend upwardly alongside of the supporting block 15 therefor and have their free upper ends 22 curved towards each other.

Bolted or otherwise rigidly secured to the outer side face of the supporting block 15 for each pair of brake shoe supporting cranks 13 is a fluid cylinder 23 containing two pistons 24. The cylinder 23 is interposed between the opposed upper ends 22 of the operating arms 19 for the brake shoe supporting cranks 13 with its pistons 24 in abutting relation to said ends of said arms. Each pair of operating arms 19 is connected by means of a coil spring 25 which operates to draw the same towards each other and thus hold their curved upper ends of said arms in engagement with the outer ends of the pistons 24. The pistons 24 are spaced apart at their inner ends by means of a coil spring 26 located in the cylinder 23. Projecting from the outer side surface of the crank supporting block 15 midway between the hubs of the operating arms 19 for the crank journaled on said block is a stop pin 27 adapted to cooperate with notches 28a in lugs 28 that project radially from the hub portions of said arms. In the retracted positions of the pistons 24 the notches 28a bear against the upper surface of the stop pin 27 and thus serve to limit movement of the operating arms towards each other, while in the outer positions of said pistons said notches abut against the bottom of said stop pin and thus limit the swinging movement of said arms away from each other. Compressed air from a suitable source under control of the operator is admitted to both fluid cylinders 23 between the opposing inner ends of the pistons 24 therein through a suitable supply pipe as shown.

By the arrangement described, pressure admitted to each fluid cylinder 23 between the inner ends of the pistons 24 therein forces said pistons outwardly, thereby causing the crank operating arms 19 to swing outwardly away from each other and rock the cranks 13 in a direction which will cause the brake shoes carried on the pins 17 of said cranks to be forced into engagement with the braking surfaces of the brake disk with equal pressure. When the fluid pressure in the cylinders 23 is released, the springs 25 which connect each pair of operating arms 19 cause the arms to swing inwardly towards each other and thus return the pistons 24 engaged therewith to their normal position, this inward swinging movement of the arms being limited by the stop pin 27 on the crank supporting block 15.

The crank supporting blocks 15 may be adjusted to accurately position the cranks carried thereby equal distances on opposite sides of the brake disk by means of shims 29 interposed between the opposing end faces of said crank supporting blocks and the laterally extending supporting brackets 4a of the end cross-member 2 of the truck. The two shoes of each pair are prevented from tipping relative to each other and dragging on the brake disk by means of pins 30 that extend through axially alined openings provided therefor in opposing lugs 31 at the outer edges of the respective shoes. As shown in the drawings, the pins 30 are threaded through the openings in the lugs 31 of one shoe of a pair and slidably engage the openings in the corresponding lug 31 in the other shoe of said pair.

When it is desired to adjust the brake shoes to take up wear of the lining thereof, the nuts 21 on the end of the crank shafts 14 are loosened, thereby permitting the radial teeth on the hubs of the operating arms 19 to be disengaged from the teeth in the outer end of the sleeves 20 and rotated on the crank shafts to any angular position desired. After such adjustment, the arms 19 are again locked to the sleeves 20 by again tightening the nuts 21. It is noted as an important advantage of the foregoing construction that it permits the size of the air cylinder 23 and the length of the operating arms 19 to be varied without changing any other part of the brake mechanism, thereby permitting the desired braking effort to be obtained for cars of varying weight and gear ratios.

An additional pair of manually operated brake shoes 32 cooperate with the opposite sides of the brake disk between the upper ends of the diametrically opposed pairs of fluid operated brake shoes 12. The mechanically operated shoes 32 are arranged one on each side of the brake disk and are moved towards each other to clamp said disk therebetween by means of a pair of levers 33 arranged one on each side of said brake disk. The two levers 33 are journaled on vertical pivots 34 that are disposed one on each side of the brake disk and are secured to the underside of a bracket 35 which is bolted to the upper face of the end cross-member 2 of the brake. The inner arms of the levers 33 are pivotally secured to the respective brake shoes and thus constitutes supports therefor; and the outer arms of said levers are connected by means of a coil spring 36 which operates to swing the levers in a direction which will cause the shoes carried thereby to move away from the side faces of the brake disk. Each shoe is held with its braking surface parallel to the braking face of the brake disk by means of a coil spring 37 which connects said shoe with the outer arm of the supporting lever therefor and holds the same in abutting relation to a lug 38 on the hub portion of said lever. The outer arm of one of the brake shoe supporting levers has a lever 39 pivotally supported therein, whose outer arm is connected to a suitable pull rod 40 and whose inner arm has a link connection 41 with the outer arm of the other brake shoe supporting lever. By this arrangement, when the pull rod 40 is shifted longitudinally in the proper direction, the lever 39 carried on the outer arm of one of the brake shoe supporting levers 33 swings on its pivot and forces the link 41 in a direction which will spread apart the outer arms of the two levers 33 and thus force the shoes carried thereby into engagement with the opposite faces of the brake disk.

Obviously, the hereinbefore described arrangement admits of considerable modification without departing from the invention. Therefore, we do not wish to be limited to the precise arrangement shown and described.

What we claim is:

1. A street car truck comprising side frames connected by a cross-member, a motor supported on said cross-member, an armature shaft extending beyond one end of said motor, a brake disk fixed to the end of said armature shaft, diametrically opposed pairs of brake shoes adapted to engage the opposite side faces of said brake disk, pairs of cranks mounted on said cross-member and cooperating with said pairs of shoes to move the same into and out of engagement with said brake disk, actuating arms on said cranks, and fluid actuated means for actuating both of said actuating arms.

2. A street car truck comprising side frames connected by a cross-member, an electric driving motor supported on said cross-member, an armature shaft extending beyond one end of said motor, a brake disk fixed to the end of said armature shaft, diametrically opposed pairs of brake shoes adapted to engage the opposite side faces of said brake disk, pairs of cranks mounted on said cross-member and cooperating with said pairs of shoes to move the same into and out of engagement with said brake disk, actuating arms on said cranks, a cylinder mounted on said cross-member between the two actuating arms of each pair of cranks, and pistons in said cylinders for actuating said actuating arms.

3. A brake disk, a stationary support, a pair of freely rockable crank shafts journaled in said support one on each side of said brake disk transverse to the axis thereof and provided at one end with crank arms terminating at their free ends in crank pins, a pair of brake shoes carried by said crank pins, and fluid operated means operatively engaging the other end of said crank shafts for rotating both cranks simultaneously to apply the shoes carried by the crank pins thereof to the opposite sides of said disk with equal pressure.

4. A brake disk, a stationary support, a pair of freely rockable cranks journaled in said support one on each side of said brake disk transverse to the axis thereof, a pair of brake shoes carried by said cranks, a pair of operating arms fixed to corresponding ends of the shafts of said cranks, and fluid operated pistons interposed between and directly engaging said operating arms for rotating both of said cranks through whatever arc is required to enable each shoe to contact with the brake disk.

5. A brake disk, a stationary support, a pair of freely rockable cranks journaled in said support one on each side of said brake disk transverse to the axis thereof, a pair of brake shoes carried by said cranks, a pair of operating arms on the corresponding ends of the shafts of said cranks, and means movable transversely of the crank axes and directly engaging the operating arms of said pair of cranks for rotating both of said cranks through whatever arc is required to enable both shoes to contact with the brake disk with equal pressure.

6. A brake disk, a stationary support, a pair of freely rockable cranks journaled in said support one on each side of said brake disk transverse to the axis thereof, a pair of brake shoes carried by said cranks, fluid operated means for rotating both of said cranks simultaneously to apply the shoes carried thereby to the opposite sides of said brake disk, and guiding means for said pair of shoes above and below the crank axes for maintaining the disk engaging surfaces thereof parallel to each other.

7. A brake disk, a stationary support, a pair of freely rockable cranks journaled in said support one on each side of said brake disk transverse to the axis thereof, a pair of brake shoes carried by said cranks, fluid operated means for rotating said cranks simultaneously to apply the shoes carried thereby to the opposite sides of said brake disk, and means connecting said pair of shoes for maintaining the disk engaging surfaces thereof parallel to each other, said connecting means comprising a pin fixed to one shoe and slidably fitting an opening provided therefor in the other shoe.

8. A brake disk, a stationary support, a pair of freely rockable cranks journaled in said support one on each side of said brake disk transverse to and substantially in the horizontal plane of the axis thereof, a pair of brake shoes carried by said cranks, fluid operated means for rotating both of said cranks simultaneously to apply the shoes carried thereby to the opposite sides of said brake disk, and separate means for positioning said shoes equal distances on opposite ends of said disk.

9. A brake disk, a stationary support, a pair of freely rockable cranks journaled in said support one on each side of said brake disk transverse to the axis thereof, a pair of brake shoes carried by said cranks, fluid operated means for rotating said cranks simultaneously to apply the shoes carried thereby to the opposite sides of said brake disk, and means for adjusting said crank support longitudinally of the disk axis to center said disk therebetween.

10. A brake disk, a stationary support, a pair of freely rockable cranks journaled in said support one on each side of said brake disk transverse to the axis thereof, a pair of brake shoes carried by said cranks, a pair of actuating arms fixed to said cranks, a cylinder interposed between said pair of actuating arms, and a pair of pistons in said cylinder and operatively engaging said pair of actuating arms.

11. A brake disk, a stationary support, a pair of freely rockable cranks journaled in said support one on each side of said brake disk transverse to the axis thereof, a pair of brake shoes carried by said cranks, a pair of actuating arms fixed to said cranks and having their free ends curved towards each other, a cylinder rigidly secured to said stationary support between the curved free ends of said pair of actuating arms, and a pair of pistons in said cylinder with the outer ends in abutting relation to the curved ends of said pair of actuating arms.

12. A brake disk, a stationary support, a pair of freely rockable cranks journaled in said support one on each side of said brake disk transverse to the axis thereof, a pair of brake shoes carried by said cranks, a pair of actuating arms fixed to said cranks and having their free ends curved towards each other, a cylinder rigidly secured to said stationary support between the curved free ends of said pair of actuating arms, a pair of pistons in said cylinder with the outer ends in abutting relation to the curved ends of said pair of actuating arms, a stop for limiting the swinging movement of said arms, and a spring connecting said arms for returning said arms and said pistons to normal position.

13. A braking system including a brake disk, diametrically opposed pairs of brake shoes adapted to engage the opposite side faces of said brake disk, means for actuating said pairs of brake shoes, a pair of brake shoes spaced between the adjacent ends of said diametrically opposed pairs of brake shoes and adapted to engage the opposite side faces of said brake disk, and means for actuating said pair of brake shoes independently of said diametrically opposed pairs of brake shoes.

14. A braking system including a brake disk, diametrically opposed pairs of brake shoes adapted to engage the opposite side faces of said brake disk, fluid operated means for actuating said pairs of brake shoes, a pair of brake shoes spaced between the adjacent ends of said diametrically opposed pairs of brake shoes and adapted to engage the opposite side faces of said brake disk and mechanically operated means for actuating said pair of brake shoes independently of said pairs of diametrically opposed brake shoes.

15. In a vehicle truck, a motor supported thereon, a shaft driven by said motor, a brake disk fixed to said shaft, diametrically opposed pairs of brake shoes adapted to engage the opposite side faces of said brake disk, pairs of cranks cooperating with said pairs of shoes to move the same into and out of engagement with the opposite side faces of said brake disk, actuating arms on said cranks, and fluid operated means for actuating the two actuating arms of each pair of cranks.

16. In a vehicle truck, an electric motor mounted thereon, an armature shaft extending beyond one end of said motor, said end of said motor being provided with an extension adapted to rotatably support the outer end portion of said armature shaft, a brake disk fixed to said armature shaft beyond the outer end of said extension, diametrically opposed pairs of brake shoes adapted to engage the opposite side faces of said brake disk, pairs of cranks cooperating with said pairs of shoes to move the same into and out of engagement with said brake disk, actuating arms on said cranks, and fluid operated means for actuating the two actuating arms of each pair of cranks.

17. A brake disk, a stationary support, diametrically opposed pairs of freely rockable crank shafts journaled in said support, the two crank shafts of each pair being journaled one on each side of said brake disk transverse to the axis thereof and having crank arms provided with crank pins, a pair of brake shoes carried by each pair of crank pins, a pair of operating arms for each pair of crank shafts, and fluid operated means for rotating both operating arms of a pair simultaneously to apply the shoes controlled thereby to the opposite sides of said disk with equal pressure.

18. A brake disk, a stationary support, a pair of freely rockable cranks journaled in said support one on each side of said brake disk transverse to the axis thereof, a pair of brake shoes carried by said cranks, fluid operated means for rotating both of said cranks simultaneously to apply the shoes carried thereby to the opposite sides of said brake disk, and guiding means for said shoes for maintaining the disk engaging surfaces thereof parallel to each other.

HERBERT W. ALDEN.
NELSON R. BROWNYER.